United States Patent [19]

Perzl

[11] Patent Number: 5,033,056
[45] Date of Patent: Jul. 16, 1991

[54] GAS LASER

[75] Inventor: Peter R. Perzl, Fürstenfeldbruck, Fed. Rep. of Germany

[73] Assignee: Heraeus Holding GmbH, Hanau am Main, Fed. Rep. of Germany

[21] Appl. No.: 525,250

[22] Filed: May 17, 1990

[30] Foreign Application Priority Data

May 17, 1989 [DE] Fed. Rep. of Germany ....... 3916008

[51] Int. Cl.⁵ .............................................. H01S 3/22
[52] U.S. Cl. ..................... 372/58; 372/701; 372/61
[58] Field of Search ................ 372/58, 59, 61, 87, 372/701

[56] References Cited

U.S. PATENT DOCUMENTS

| | | | |
|---|---|---|---|
| 3,772,610 | 11/1973 | Foster | 372/58 |
| 4,058,778 | 11/1977 | Fahlen et al. | 372/58 |
| 4,077,018 | 2/1978 | Fahlen et al. | 372/58 |
| 4,200,819 | 4/1980 | Haslund | 372/58 |
| 4,217,560 | 8/1980 | Kosyrev et al. | 372/58 |
| 4,571,730 | 2/1986 | Mizoguchi et al. | 372/58 |
| 4,611,327 | 9/1986 | Clark et al. | 372/58 |
| 4,635,269 | 1/1987 | Reilly et al. | 372/58 |
| 4,760,581 | 7/1988 | Hoag | 372/61 |
| 4,771,436 | 9/1988 | Koseki | 372/59 |

Primary Examiner—Léon Scott, Jr.
Attorney, Agent, or Firm—Felfe & Lynch

[57] ABSTRACT

A gas laser has a closed gas flow channel in which a gas flows at high velocity through a discharge chamber, the gas discharge burning between at least two electrodes extending transversely of the gas flow. A cross-current blower for maintaining the gas flow has an axis of rotation which runs parallel to the optical axis and buckets are disposed substantially free-standing such that the gas stream flows twice through the bucket wheel, the delivery side of the blower being separated from the intake side at the inner wall of the gas flow channel by a baffle body extending in direction of the axis of the blower and reaching the outer edges of the buckets. To reduce turbulence occurring on the delivery side of the blower in the vicinity of the inner wall of the flow channel and to achieve a high pressure difference between the intake and delivery side with a stable characteristic, a side channel branches off from the gas flow channel at the inner wall on the delivery side, the flow baffle body forming the outer wall of the side channel and the side channel returning the branched-off gas stream to the blower buckets. The inner wall of the side channel is formed by an additional baffle body extending in the same direction as the axis of the blower.

15 Claims, 2 Drawing Sheets

GAS LASER

BACKGROUND OF THE INVENTION

The present invention relates to a gas laser with a closed gas channel wherein a gas flows at high velocity through a discharge chamber in which the gas discharge burns between at least two electrodes which extend transversely of the gas flow, and having for the maintenance of the gas flow a cross-current blower whose axis of rotation is parallel to the optical axis and whose buckets are disposed free-standing such that the gas stream flows twice through the bucket wheel. The delivery side of the blower is separated from its intake side on the inner wall of the gas channel by a baffle body extending in the same direction as the axis of the blower and reaching to the outer edges of the buckets, and such that the gas stream is fed from the delivery side through an approach channel to the discharge chamber.

A gas laser of this kind is disclosed both in GB-A 21 35 815 and in U.S. Pat. No. 4,686,680.

In transversely swept gas transport lasers, a cross-current blower is often used as the pump for circulating the laser medium, a type of blower which is well suited for this type of laser on account of its simple construction and its good volumetric output capacity. There is also the fact that the blower rotor extends parallel to the discharge over entire length of the latter, and due to the elimination of gas guiding means around axes perpendicular to the blower axis, a completely even sweeping of the entire laser cross section becomes possible. This leads to easily comprehensible bidimensional flow processes and to an uncomplicated scaling of the system in the direction of the optical axis without having to make basic changes in the flow system. With these cross-current blowers large-volume flows can be produced, but at relatively low pressure differences between the intake and discharge sides of the blower. Consequently the entire gas circuit of the laser must be so configured that the lowest possible pressure loss and the most uniform flow possible will be obtained with a low degree of turbulence so as not to provoke instability in the area of the electrical gas discharge.

Usually, blowers from the ventilation and air conditioning art are used, for example, but they are not designed either for the heavy throttling of the gas circuit that occurs in this case, nor for a low degree of turbulence. The main feature of these blowers is a high blowing efficiency, which, again, is of no interest in lasers operating in the lower-than-atmospheric pressure range. When severely throttled, the working points of these blowers are in the unstable part of their characteristic, which can signify especially great differences in the flow conditions over the length of the blower. It is typical of such cross-current blowers that, in the transition between the discharge and the intake side, which are separated from one another by baffles, an eddy forms which rotates in the same sense as the blower and passes partially through the buckets. If the throttling changes, the position of this eddy changes both against the direction of rotation of the blower and toward the interior of the blower. The blower characteristic, and hence the main characteristics of the blower, are determined by this eddy shift.

The gas laser described in GB-A 21 35 815 has a so-called cross-current blower in which the buckets are disposed substantially free-standing such that the gas stream passes twice through the bucket wheel. The gas channel on the delivery side of the blower is defined by a nose-shaped baffle body which partially surrounds the outer circumference of the buckets on the intake side of the blower. The gas channel carries the gas stream from the delivery side of the blower toward the discharge chamber, and this main channel tapers toward the discharge chamber.

In contrast to the laser of GB-A 21 35 815, in the laser of U.S. Pat. No. 4,686,680, instead of the nose-shaped baffle body on the delivery side of the laser, a thin sheet-metal baffle is used which separates the delivery side from the intake side of the blower. The free edge of this baffle reaches to the outer periphery of the buckets of the blower and is aligned with its tangents in the same direction as the axis of rotation of the blower.

As mentioned above, in such blowers turbulence is produced on the delivery side, which leads to irregularities in the flow. In particular, turbulence develops on the inner side of the channel in the area in which the wall defining the main channel reaches the buckets. Such turbulence continues under certain circumstances all the way to the discharge chamber.

SUMMARY OF THE INVENTION

The present invention is aimed at optimizing a gas laser having a cross-current blower of the kind described above, such that turbulence occurring on the delivery side of the blower in the area of the inner wall of the channel will be eliminated to such an extent that it will not impair the main flow to the discharge section. The blower at the same time will be optimized such that a high difference in pressure between the intake and delivery side will be achieved with a stable characteristic.

This aim is achieved in that on the delivery side, at the inner wall, a side channel branches off from the outflow channel, while the baffle body forming the outer wall of the side channel returns the branch gas stream to the blower buckets and the inner wall of the side channel being formed by an additional baffle body extending in the same direction as the axis of the blower. The side channel sustains a controlled eddying which is formed by the pressure difference at the buckets, between the delivery side and the intake side of the blower, and which is held in this area regardless of how the circulating flow is throttled. An extremely disadvantageous shift of this eddying toward the blower axis by throttling is suppressed and any shift contrary to the direction of rotation of the blower is controllable and is kept small. Furthermore, the turbulence in the area of the inner wall of the gas channel on the delivery side of the blower is substantially reduced or completely suppressed by this feedback of the gas flow through the side channel. The length of this side channel or recirculation channel should be made as great as possible, the length being limited by the compactness of the cross section of the laser. The increasing length of the recirculation channel produces an isolation of the controlling circulation from any disturbances in the main flow. At the same time the inherent damping of the system is improved, i.e., fluctuations in the gas flow are eliminated or substantially reduced.

In an advantageous further development, the side channel should taper transversely of the direction of flow from the branching point to the blower buckets, this tapering being preferably constant. This cross-sectional reduction prevents separation at the walls of the side channel, which otherwise would result in turbulence in this side channel. Such turbulence in the side channel would otherwise have a negative effect on the position of the main eddy, which is to be maintained controlledly in the area of the buckets. The total flow would then break up, at least for brief periods, so that fluctuations might occur in the laser output.

Preferably the exit opening of the side channel is configured as a nozzle such that a precisely directed gas stream will flow from this nozzle to the buckets of the blower. With such a nozzle the gas stream can be definitely aimed at the buckets of the blower.

The gas stream should issue from the side channel, preferably tangentially against the direction of rotation of the buckets, resulting in a smooth flow against the edges of the blower buckets. Preferably, the main direction of issuance at the orifice of the nozzle is formed between a line passing through the tangential planes of the outer bucket edges and the tangential planes of the circumference of the circle on which the bucket edges lie.

In a preferred form of the side channel, the outer wall of the side channel that lies opposite the outer wall of the main flow channel forms on the entrance end of the side channel a cylindrical surface which then terminates preferably at the exit end of the side channel in a flat surface which simultaneously defines one end of the nozzle. An additional rear baffle surface on the surface associated with the outer wall of the side channel in the vicinity of the nozzle on the intake side of the blower, which should terminate at the edge of the outer wall of the side channel, brings it about that a very thin edge is formed which separates the intake side from the delivery side of the blower, and thus no appreciable disturbances occur in the wake of the edge, i.e., in the direction of the continuation of the edge.

An additional baffle surface which is associated with the rear baffle surface on the intake side of the blower and by which a gas channel is formed in cooperation with the rear baffle surface, serves the purpose, like the recirculation channel or side channel on the delivery side of the blower, of assuring a controlled guidance of the stream on the intake side of the blower. The deliberately sustained main eddy is thus maintained on the delivery side at the exit end of the side channel, without the formation of the turbulence that could occur on the intake side without this additional channel. This additional baffle surface should form a nozzle at the delivery side and thus a controlled gas stream without separation of the flow in the area of the walls defining the channel. The main direction of the jet from this nozzle on the intake side of the blower is preferably tangential against the direction of rotation of the rotor. By this guidance of the gas stream on the intake side of the blower, the flow strikes the edges of the buckets of the blower in a smooth manner. To increase the suppression of the feedback between the main gas stream and the flow entering the side channel, an additional grid in the area where the side channel branches off can be helpful. If this grid is disposed at the entry of the side channel, turbulence on the back of the grid, considered in the direction of flow, becomes rectified in the course of the convergent channel. The pressure difference should be produced by a grid whose open passage area is no more than 30% less than the cross section of the side channel.

DETAILED DESCRIPTION OF THE PREFERRED EMBODIMENT

Figure 1:
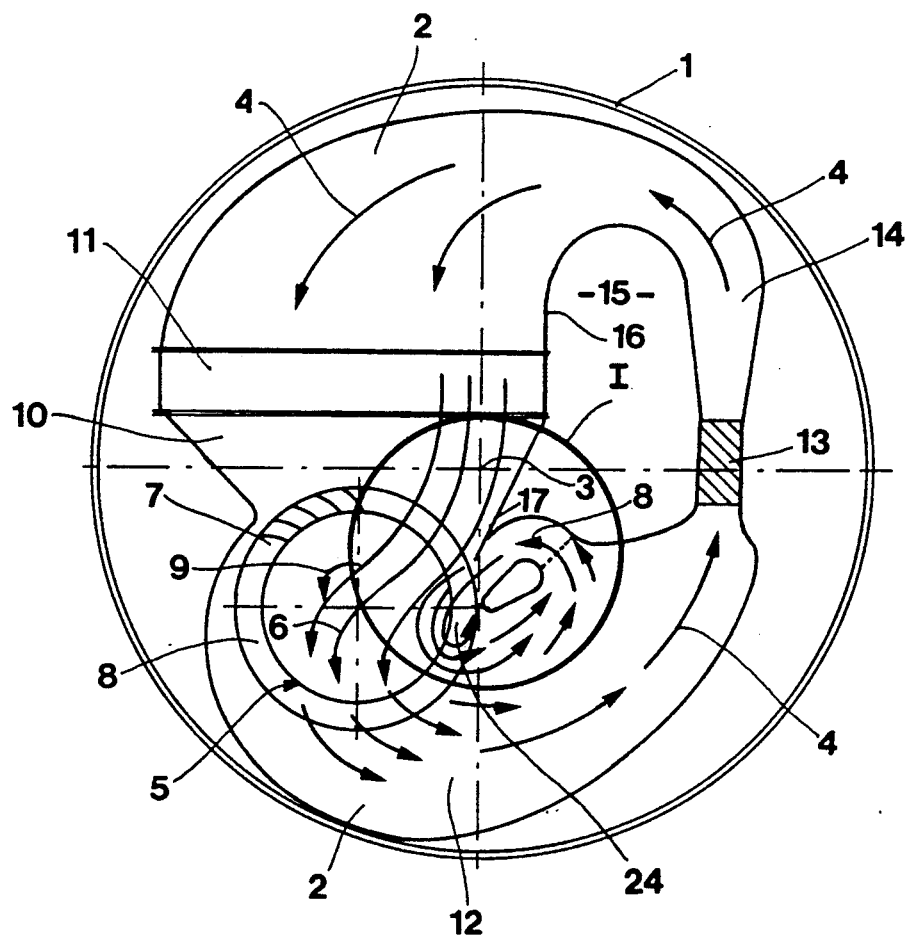
FIG. 1 is a cross section taken perpendicular to the axis of a blower and perpendicular to the optical axis of a laser.
Figure 2:
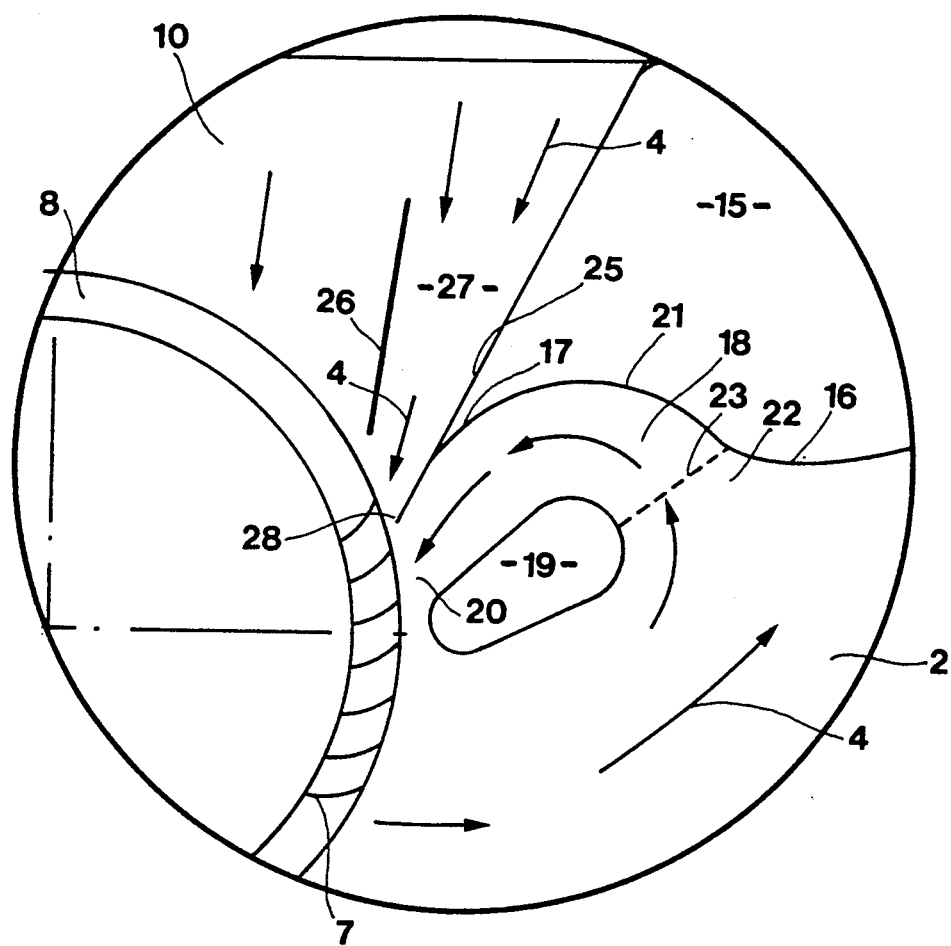
FIG. 2 is an enlarged representation of the detail indicated at I in FIG. 1.

The laser has an elongated housing 1 of circular cross section, whose entire cross section is filled by a closed gas flow channel 2. The axis of the housing 1 is identified by the reference number 3. In the gas channel 2 a flow of gas, indicated by the flow arrows 4, is maintained by a cross-current blower 5. The blower axis 6 runs parallel to the axis 3 of the housing 1. The blower 5 has a bucket wheel 8 composed of individual buckets 7 whose direction of rotation is indicated by the arrow 9. The individual buckets 7 of the bucket wheel 8 of blower 5 are free-standing, so that the gas stream can pass through this bucket wheel 8. At the intake side 10 a cooler 11 is inserted into the flow channel 2 in order to cool the gas stream at the entry into the blower 5. At the delivery side 12 the gas flow channel 2 narrows toward the discharge chamber 13 which is indicated by the hatching, and it expands again in the form of a diffuser 14 after the gas discharge chamber 13. At the end of the main baffle body 15 remote from the blower the gas stream is turned approximately 180° back toward the cooler 11. The optical axis of the laser runs parallel to the axis 3 of the housing 1 and the blower axis 6. At the inside wall 16 of the gas flow channel 2, which is formed by the baffle body 15, the delivery side 12 is separated from the intake side 10 of the blower by a first baffle 17 extending toward the axis 6 of the blower 5 and forming a part of the baffle body 15. At the delivery side 12 of the blower 6, a side channel 18 branches off from the main gas flow channel 2, as indicated in FIG. 2, at the inner wall 16, and is separated by an additional baffle body 19 extending in the same direction as the axis 6 of the blower 5. A portion of the main flow in the main gas flow channel 2 is turned around by this side channel 18 and fed to the bucket wheel 8 of the blower 5. The walls of the side channel are disposed in relation to the buckets 7 of the blower 5 such that the channel narrows and forms a nozzle at its exit opening 20. This side channel 18 forms a feedback channel, i.e., a portion of the gas flow is fed toward the buckets 7. The gas stream is controlledly and definitely aimed by this nozzle or exit opening 20 against the buckets of the blower, whereas the main direction of issuance at the mouth of this nozzle lies between a line formed by the tangential planes of the outer bucket edges and the tangential planes of the circumferential circle on which the bucket edges lie. The outer wall 21 of the side channel 18 forms a segment of a cylinder. At the branching point 22 of the side channel 18 there is inserted a grid 23 which covers the entire flow channel. By means of this grid 23 a pressure difference is formed between the main gas flow channel 2 and the side channel 18 in order to achieve a feedback between the main gas flow and the flow which enters the side channel 18. By arranging this grid 23 at the entrance of the side channel, turbulence on the back of the grid is rectified in the course of the convergent side channel 18. The grid 23 has an open passage area that is about 25% smaller than the cross section of the side channel 18. By this flow channel 18 a controlled position is obtained for the eddy occurring in the area of the buckets 7 of the blower 5 and identified in the figures by the number 24, regardless of the strength of the throttling of the flow circuit in this area. At the same time, turbulence is suppressed on the delivery side 12 of the blower 5 by the branching off of the gas stream in the side channel 18, so that the main stream enters free of turbulence into the gas discharge chamber 13. A flow guiding body 17 is made very thin at its end pointing toward the bucket wheel 8, while the back guiding surface 25 terminates in a common edge with the inner wall 16 of the baffle body 15.

On the intake side 10 of the blower 5, an additional baffle 26 is disposed at a distance from the back baffle surface 25 and together they form an additional channel 27 which tapers toward the bucket wheel 8 to form a nozzle. By this channel 27 a portion of the gas flow is directed against the bucket wheel 8, so that no appreciable disturbances occur at the edge 28 of the baffle body 17. The additional baffle 26 should reach all the way to the periphery of the bucket wheel 8, so that the flow issuing through this additional channel 27 will strike the edges of the buckets 7 tangentially.

I claim:

1. Gas laser apparatus comprising
   a closed main gas flow channel in which an active gas flows, said channel having an inner wall and an outer wall,
   a gas discharge chamber in said channel, said chamber having a pair of electrodes defining an electrical field direction therebetween, said gas flowing at high velocity between said electrodes in a flow direction perpendicular to said field direction and defining an optical axis perpendicular to both said field direction and said flow direction,
   a cross current blower extending across said channel and having an axis of rotation parallel to said optical axis, said blower comprising a bucket wheel having a plurality of open buckets disposed so that said gas passes through said wheel, thereby defining an intake side and a discharge side,
   a main baffle body extending parallel to the axis of the blower and defining most of said inner wall of said channel, said body having a first baffle extending to the buckets on the intake side of said blower, and
   an additional baffle body proximate to said blower and defining said inner wall at said discharge side of said channel, said additional baffle body being spaced from said main baffle body to define a side channel therebetween, said side channel having a branching-off point at said main gas glow flow channel, an outer wall defined by said main baffle body, and an exit opening at said intake side of said blower.

2. Gas laser according to claim 1, characterized in that the side channel (18) tapers transversely of the direction of flow (4) from the branching-off point (22) to the blower buckets (7).

3. Gas laser according to claim 2, characterized in that the side channel (18) tapers constantly.

4. Gas laser according to claim 2, characterized in that the exit opening (20) of the side channel (18) forms a nozzle.

5. Gas laser according to claim 1, characterized in that the main direction of issuance (4) of the gas stream from the side channel (18) is aimed tangentially against the direction of rotation (9) of the buckets (7).

6. Gas laser according to claim 5, characterized in that said buckets have outer edges which lie on a circumferential circle of said bucket wheel and the main direction of gas flow from the nozzle lies in the direction which is formed by the tangential planes of the outer bucket edges and the tangential planes of the circumferential circle on which the bucket edges lie.

7. Gas laser according to claim 1, characterized in that the outer wall (21) of the side channel (18) forms at the entry side the portion of a cylinder periphery.

8. Gas laser according to claim 1, characterized in that the outer wall (21) of the side channel (18) forms at the nozzle a planar surface.

9. Gas laser according to claim 1, characterized in that said first baffle forms the outer wall (21) of the side channel (18) in the area of the exit opening on the intake side (10) of the blower (5).

10. Gas laser according to claim 9, characterized in that additional baffle (26) is spaced from the first baffle on the intake side (10) of the blower (5), an additional flow channel (27) being formed between these baffles.

11. Gas laser according to claim 10, characterized in that the additional baffle (26) extends to the buckets (7).

12. Gas laser according to claim 10, characterized in that the additional flow channel (27) tapers toward the buckets(7), forming a nozzle.

13. Gas laser according to claim 12, characterized in that the main direction of gas flow from the nozzle is aimed tangentially against the direction of rotation (9) of the blower.

14. Gas laser according to claim 1, characterized in that a grid is inserted in the side channel (18) near the branching-off point (22), which grid forms a flow resistance at this point of entry to the side channel (18).

15. Gas laser according to claim 14, characterized in that the grid (23) has an open passage area which is no more than 30% less than the cross section of the side channel (18) where said grid is inserted.

* * * * *